Sept. 17, 1940.     O. H. PIEPER     2,214,775
UNITARY DENTAL APPARATUS
Filed Feb. 23, 1938     3 Sheets-Sheet 1
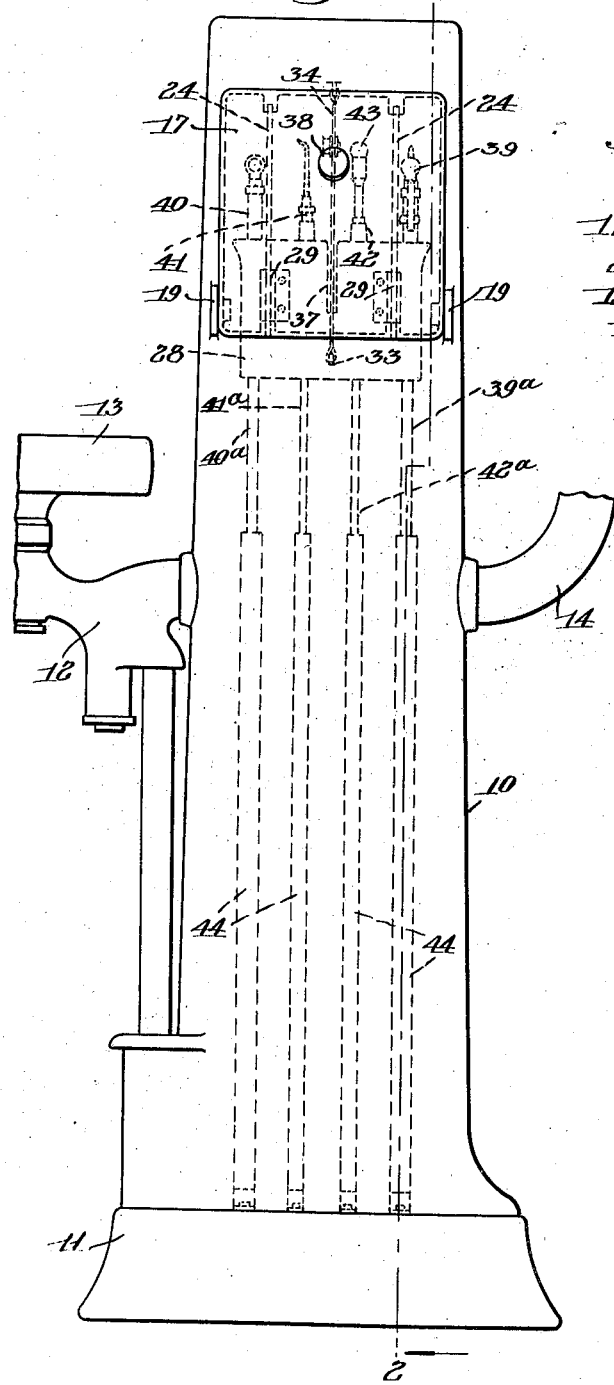
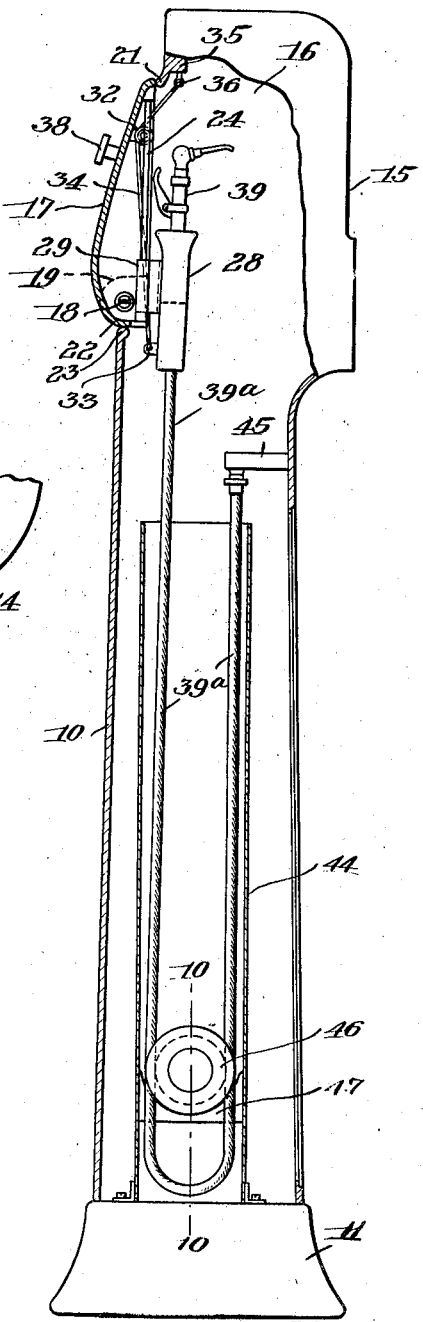
INVENTOR.
Oscar H. Pieper
BY
Crumpton & Shepard
his ATTORNEYS

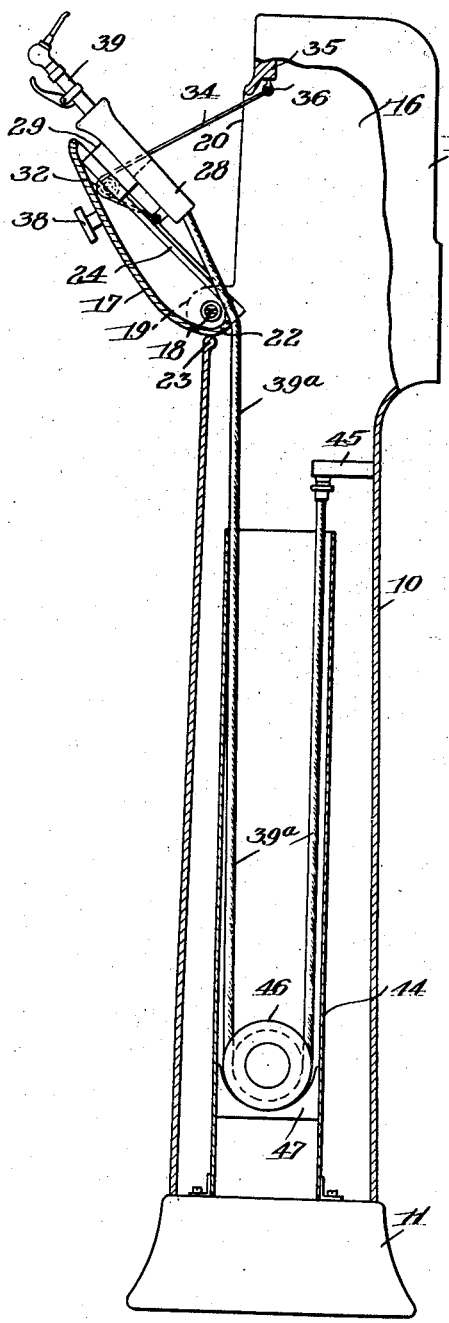
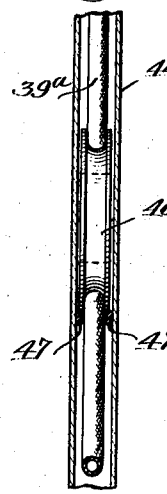
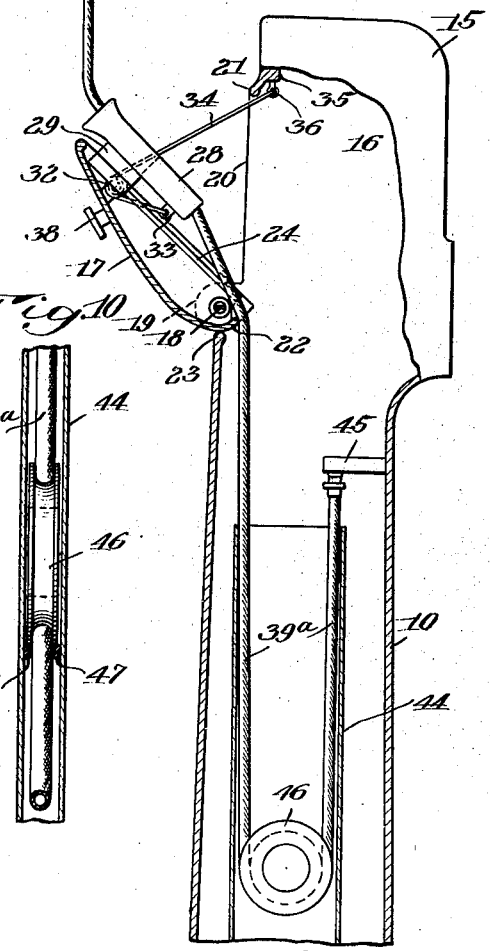

Sept. 17, 1940. O. H. PIEPER 2,214,775
UNITARY DENTAL APPARATUS
Filed Feb. 23, 1938 3 Sheets-Sheet 3
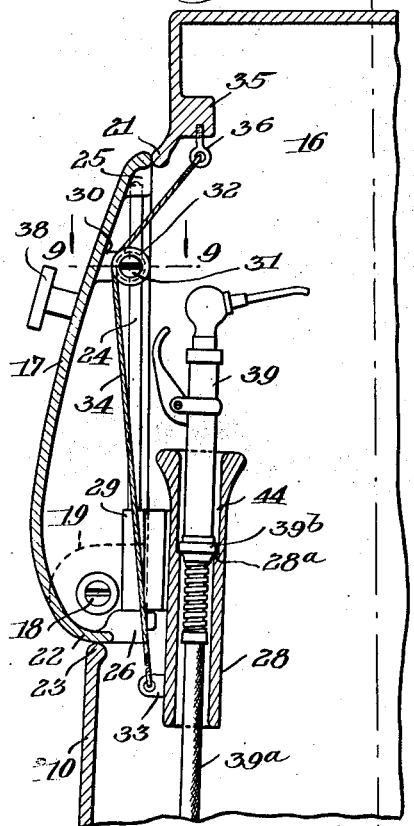
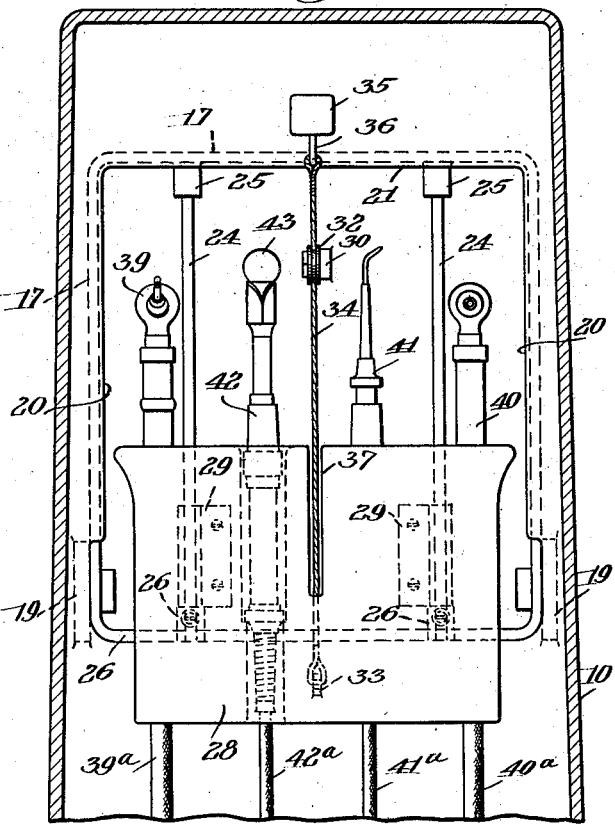
INVENTOR.
Oscar H. Pieper
BY Cumpston & Shepard
his ATTORNEYS Patented Sept. 17, 1940

2,214,775

UNITED STATES PATENT OFFICE 2,214,775

UNITARY DENTAL APPARATUS

Oscar H. Pieper, Rochester, N. Y.

Application February 23, 1938, Serial No. 192,125

9 Claims. (Cl. 32—22)

The present invention relates to dental apparatus such, for example, as a dental equipment stand or unit of the type adapted to support a variety of instruments or appliances adjacent the dental chair and within easy reach of the operator.

The invention has for its object more particularly to provide in apparatus of this class, compact, unitary, and simplified means for protecting and controlling various electrical, compressed air, water, and gas appliances for use by dentists in the performance of different operations and which can be manufactured and assembled at a moderate cost.

A further object of the invention is to provide in combination with means for housing and protecting a variety of instruments, and especially a number of the hand instruments to be used by dentists, improved automatic holding and positioning means for the instruments adapted to render them readily accessible when needed as well as to insure greater service when in use.

A further object of the invention is to provide a unitary structure on which the various instruments are assembled in juxtaposition and which embodies relatively few parts of simple construction, designed to be conveniently operated and controlled and to facilitate the selection and handling of the instruments.

To these and other ends the invention resides in certain improvements and combinations of parts, all as will be hereinafter more fully described, the novel features being pointed out in the claims at the end of the specification.

In the drawings:

Fig. 1 is a front elevational view of a portion of a dental stand to which the invention is shown applied;

Fig. 2 is a vertical sectional elevation substantially on line 2—2 of Fig. 1;

Fig. 3 is a view similar to Fig. 2, showing the instrument supporting closure in open position and the instrument holder at its outermost position on the closure;

Fig. 4 is a view similar to Fig. 3, showing one of the instruments withdrawn from the holder;

Fig. 5 is a fragmentary vertical sectional view through the upper portion of the dental stand, drawn to an enlarged scale and showing the position of the closure when the instruments are not in use;

Fig. 6 is a vertical sectional view on line 6—6 of Fig. 5;

Fig. 7 is a horizontal section through the upper portion of the dental stand showing the relationship of the closure and instrument holder connected thereto;

Fig. 8 is a detail sectional view through the bottom of the closure, drawn to an enlarged scale and showing the manner of securing one of the guide rods for the instrument holder on the closure;

Fig. 9 is a detail sectional view on line 9—9 of Fig. 5, and

Fig. 10 is a sectional view taken on line 10—10 of Fig. 2.

The same reference numerals throughout the several views indicate the same parts.

The preferred embodiment of the invention disclosed herein by way of illustration comprises a hollow supporting column or standard 10 resting on a base 11 of any suitable design. The column has extended from one side thereof an arm 12 carrying a fountain cuspidor bowl 13 and a drinking fountain, not shown. At the opposite side of the column is a portion of an arm 14 for supporting various dental appliances, such, for example, as an instrument tray, gas burner, dental motor, and other equipment, not shown. Moreover the stand may be provided with such other fixtures or appliances as it may be deemed necessary to provide, including, for example, the usual spray bottle warmers, and a switchboard whereby the electrically operated instruments may be connected in circuit and controlled as desired.

The upper end 15 of the column is provided with a recess or compartment 16 for housing and protecting various instruments or dental appliances which are assembled in juxtaposition and located within easy reach of the dentist in order that he may readily make use of the same. The instruments are normally maintained within the compartment by a suitable carrier or supporting device provided with a simple form of mechanism for automatically moving the instruments into position to render them accessible for use upon movement of said device to a predetermined position relative to the column. The carrier or supporting device may be of any preferred design but preferably comprises a closure 17 for the compartment and other parts connected thereto and described hereinafter.

The closure 17 is connected by a pair of pivot members 18 with the forwardly extending lugs 19 at the bottom of the vertical front wall portions 20 of the column. The front wall portions 20, taken with the upper and lower portions 21 and 22 of the front wall of the column form a seat for the closure and cooperate with the latter when in normal position to protect the compartment and the instruments therein against the entrance of dust and other foreign matter thereto.

Disposed at the inner side of the closure are a pair of vertically extending guides or rods 24 each having its upper end extended within a boss 25 on the closure and its lower end within a lug 26 on the bottom edge of the closure, within which the rod is secured by a set-screw 27, Figs. 5 and 8. An instrument holder 28 is disposed within the compartment and is provided with inwardly extending lugs or members 29 slidably engaging the rods 24, thus providing for movement of the holder on the closure between the lowered and raised positions shown in Figs. 2 and 3. The closure is provided adjacent its upper end with a rearwardly extending part 30 with which is suitably connected a pin 31 on which is free to rotate a small pulley 32, Figs. 6 and 9. The holder 28 may be of any preferred design and is provided adjacent its lower end with a lug 33 with which is connected one end of a flexible operating connection 34, preferably a cable, which is extended over the pulley and suitably connected at its upper end with a lug 35 on the inner wall of the column as, for example, by means of a screw 36, Figs. 5 and 6. The holder is provided with a vertically extending slot 37 to afford clearance for the cable 34 when swinging the closure to the open position shown in Fig. 3, by pulling on the knob or handle 38 attached to the closure to form means for moving the same to and from closed position. It will be apparent that on opening the closure the cable or operating connection 34 will move the holder upwardly and outwardly on the guides 24 to a position in advance of the compartment as shown in Fig. 3. Moreover, upon returning the closure to normal position the holder will be moved downwardly on the guides by the action of gravity to the lowered position shown in Fig. 2.

The holder shown is for the reception of the handles or mountings of a number of different instruments such, for example, as the hot air syringe 39, an air nozzle 40, a cautery 41, and a handle 42 for supporting various electrically operated instruments adapted to be interchangeably connected with the handle, one of which comprises the examination lamp 43. The holder is preferably provided with an opening for the reception of each of the instruments or the mountings therefor, one of the openings being shown at 44 in Fig. 5, and within which is extended the handle of the hot air syringe 39 which has an enlarged portion 39b seated on an annular shoulder 28a of the holder. It will be understood however that the construction of the holder may be varied as desired to accommodate it to different types of instruments to be mounted thereon.

The air or fluid supply conduits for the instruments 39 and 40 are indicated at 39a and 40a, respectively, and the cords containing the circuit connections for the cautery 41 and hand piece 42 are indicated at 41a and 42a, respectively, said conduits and cords each extending downwardly from the holder 28 within a channel-shaped member 44, housed within the column 10 and suitably connected with the base 11 thereof. The inner ends of said cord-circuits and conduits are carried upwardly within the column to a point above the channels and each suitably connected to a hollow member 45, preferably secured on the rear wall of the column, Fig. 2. The hollow members 45 to which the fluid supply conduits 39a and 40a are connected are in turn connected with a suitable fluid supply source under pressure, not shown. Likewise the members 45 to which the cords 41a and 42a are connected each is electrically connected with a current supply source, not shown.

Disposed within each of the channel members 44 is a counterbalancing weight 46 in the form of a pulley which is guided by and free to move up and down within the channel. The pulley is normally supported above the loop of the cord or conduit by a pair of cushioning members 47 each being generally U-shaped in cross section and formed of resilient material such, for example, as rubber, said members being cemented to the walls of the channel or otherwise secured thereon and forming seats for the flanges of the pulley as shown in Fig. 10.

In order to relieve the operator of having to lift any of the counterbalancing weights 46 upon moving the closure to open position, as shown in Fig. 3, the cushioning supports 47 for the weights are each positioned within its corresponding channel 44 a predetermined distance above the bottom thereof. This distance is such as to permit the closure 17 to be opened to the desired extent without causing the loop of the cord or conduit to pick up the weight corresponding thereto. For example, when the closure has been moved to the open position shown in Fig. 3, the loop of the conduit 39a will be immediately beneath the pulley 46 resting on the supports 47, Fig. 3. However, with the closure in open position, withdrawal of any one of the instruments from the holder will cause its corresponding cord or conduit to elevate the pulley associated therewith as indicated, for example, in Fig. 4, in which the hot air syringe 39 is shown removed from the holder 28.

It will be understood that when the operator is through using any one of the instruments he will allow it to be returned to normal position on the holder by the pull of the counterbalancing weight or pulley 46 on the cord or conduit with which the instrument is connected. Upon downward movement of the pulleys to their lowermost positions they will be cushioned by the resilient members 47 thus insuring quiet operation of the parts when restoring the different instruments to normal position on the holder 28.

In the operation of the instrument supporting means to effect removal of the instruments from the compartment 16 and to position them in advance thereof ready for use, it is only necessary for the operator to swing the closure outwardly from the position shown in Fig. 2 to that shown in Fig. 3. During movement of the closure to open position the instrument holder 28 will be automatically moved relative to the closure and in an outward and upward direction for the purpose of extending the instruments or the handles thereof above or beyond the closure whereby to render them readily accessible by positioning them in convenient reach of the operator. The movement of the instrument holder outwardly on the guide rods 24 of the closure is effected by the action of the pulley 32 on the cable 34, the pulley cooperating with the cable to accelerate the movement of the holder when it is being elevated from the position shown in Fig. 2 to that shown in Fig. 3, as will be apparent from the arrangement of parts shown.

With the holder in the position indicated in Fig. 3 the operator may conveniently grasp any one of the instruments he desires to use and readily withdraw it from the holder. Upon completion of the different operations from time to time the closure will be returned to normal position, as shown in Fig. 2, to protect the instruments carried by the closure. During return of the closure to normal position the action of gravity on the instrument holder will cause it to be moved downwardly to its lowermost position within the compartment 16.

The closure may be opened to any desired extent but it is found that satisfactory results are afforded by moving it through an angle of about forty-five degrees. It will be understood that if desired, any adjustable stop means may be provided for limiting the extent of movement of the closure when swinging it from closed to open position.

It will be apparent from the above described construction that the closure comprises means connecting it, the main column or pedestal frame 10, and also the instrument holder, for moving the holder outwardly on the rods or guideways 24 on the closure, as a result of the opening movement of the closure. This actuating means is of such a character as to afford an ample movement of the holder, from a position inside the pedestal frame 10, to a position wholly outside the same, so as to accessibly present the instruments beyond the outer edge of the closure where they may be readily grasped for extension to the point of use. During such movement of the closure, the tensioning means comprising the pulleys 46 is inoperative, to relieve the closure of tension, but the removal of the instruments from the holder brings their flexible supply elements 39a, 40a, 41a, and 42a into engagement with the tensioning pulleys 46 for retracting the instruments and their supply elements after use. The means for projecting the instruments bodily from a position within to a position wholly outside the pedestal or column frame 10, to make them readily accessible for use, is thus coordinated with the tensioning means for the supply elements of the instruments in such a way as to prevent interference by the tensioning means with the movement of the closure, but to condition the tensioning means for operation only during the extension of the instruments and their flexible elements beyond the holder.

It will be understoood that the term "instrument" used in the claims may be considered to include the holder therefor, the term being used in this connection in its broadest sense.

The use of the holder is of course made especially advantageous as a means for supporting a plurality of instruments in order that they may all be projected from the compartment for housing the same at one operation and preferably by the use of a single actuating connector such, for example, as the cable 34, although a plurality of suitable connectors can readily be provided for moving the holder if desired.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A dental unit comprising a hollow frame having an opening in a wall thereof, a closure for said opening pivotally supported on said frame, an instrument holder supported on and movable with said closure and having, in addition, an outward movement on said closure toward the outer edge thereof when in open position, to present an instrument in said holder in accessible position adjacent said outer closure edge, and means connected with said frame, said closure, and said holder for effecting said outward movement of said holder on said closure as a result of said pivotal movement of said closure.

2. A dental unit comprising a hollow main pedestal frame having an opening in a wall thereof, a closure for said opening movably supported on said frame, a guideway on said closure extending outwardly from said frame in the open position of the closure, an instrument holder having an outward sliding movement on said guideway to present an instrument for ready accessibility, and means connected with said frame, said closure and said holder, for effecting said movement of said holder as a result of movement of said closure.

3. A dental unit comprising a hollow main pedestal frame having an opening in a wall thereof, a closure for said opening movably supported on said frame, an instrument holder on said closure and movable relatively to the inner side thereof substantially parallel therewith and outwardly from said frame, and flexible means connecting said frame, said closure and said holder and actuated by movement of said closure, for effecting said movement of said holder relatively to said closure to present an instrument for ready accessibility.

4. A dental unit comprising a frame having an opening in a wall thereof, a closure for said opening movably supported on said frame, an instrument holder movable with and also relatively to said closure outwardly from said frame to present an instrument for ready accessibility, and a cable connected with said frame, said closure and said holder for effecting said movement of said holder relatively to said closure as a result of movement of said closure.

5. A dental unit comprising a frame having an opening in a wall thereof, a closure for said opening pivotally supported on said frame, an instrument holder movable relatively to said closure outwardly from said frame to present an instrument beyond said closure for ready accessibility, a pulley on said closure in spaced relation with said pivot, and a cable connected with said frame and holder and passing around said pulley, for effecting said movement of said holder as a result of movement of said closure.

6. A dental unit comprising a frame having an opening in a wall thereof, a closure for said opening pivotally supported on said frame, a guideway on said closure extending outwardly from said frame in the open position of the closure, a dental instrument, a flexible element in said frame connected to said instrument for supplying an operating medium thereto, an instrument holder having an outward sliding movement on said guideway to present said instrument beyond said closure for ready accessibility, a pulley on said closure in spaced relation with said closure pivot, and a cable connected with said frame and holder and passing around said pulley for effecting said movement of said holder as the result of movement of said closure.

7. A dental unit comprising a hollow frame having an opening in a wall thereof, a closure for said opening movably supported on said frame, a dental instrument, a flexible element in said frame connected with said instrument for supplying an operating medium thereto, a holder for said instrument movable with and also relatively to said closure from a position within to a position outside said frame to present said instrument outwardly beyond said closure for ready accessibility, means connected with said frame, said closure and said holder, for effecting said movement of said holder relatively to said closure as the result of movement of said closure, and tensioning means for said element inoperative during movement of said instrument and said closure, to relieve said closure of tension, but acting to tension said flexible element during extension of said instrument from said holder, for retracting said element and instrument after use.

8. A dental unit comprising a hollow main pedestal frame having an opening in a wall thereof, a closure movable on said frame to open and close said opening, a dental instrument, a flexible element looped in said frame and connected with said instrument for supplying an operating medium thereto, an instrument holder movable with and relatively to said closure from a position within to a position outside said frame to present said instrument for removal from said holder and extension with said element to a point of use, means connected with said frame, said closure and said holder, for effecting said movement of said holder relatively to said closure as the result of movement of said closure, pulley means engageable with the loop of said element for tensioning the same, and a stop for disengaging said pulley means from said element during movement of said closure to relieve the same of tension, said pulley being positioned to engage and tension said element during extension of said instrument from said holder for retracting said element and instrument after use.

9. A dental unit comprising a hollow frame having an opening in a wall thereof, a closure for said opening pivotally supported on said frame, an instrument holder supported on and movable with said closure and having, in addition, an outward movement on said closure toward the outer edge thereof when in open position, to present an instrument in said holder in accessible position adjacent said outer closure edge, and means connected with said frame and said holder for effecting said outward movement of said holder on said closure as a result of said pivotal movement of said closure.

OSCAR H. PIEPER.